United States Patent [19]

Shaw et al.

[11] 4,342,199

[45] Aug. 3, 1982

[54] SCREW COMPRESSOR SLIDE VALVE ENGINE RPM TRACKING SYSTEM

[75] Inventors: David N. Shaw, Unionville; Joseph A. L. N. Gagnon, Windsor Locks, both of Conn.

[73] Assignee: Dunham-Bush, Inc., West Hartford, Conn.

[21] Appl. No.: 193,696

[22] Filed: Oct. 3, 1980

[51] Int. Cl.³ .......................... B60H 3/04; F25B 41/00
[52] U.S. Cl. .................................. 62/133; 62/196 C; 62/228; 417/310
[58] Field of Search .................. 62/133, 228 C, 228 D, 62/196 C, 510; 418/280, 293, 310

[56] References Cited

U.S. PATENT DOCUMENTS

| | | | |
|---|---|---|---|
| 3,859,814 | 1/1975 | Grant | 62/510 X |
| 4,135,368 | 1/1979 | Mohr et al. | 62/133 |
| 4,222,716 | 9/1980 | Shaw | 417/310 |
| 4,269,033 | 5/1981 | Birch | 62/133 |

*Primary Examiner*—William E. Wayner
*Attorney, Agent, or Firm*—Sughrue, Mion, Zinn, Macpeak & Seas

[57] ABSTRACT

A vehicle engine driven helical screw compressor for a gas refrigeration system includes a slide valve actuator for shifting the compressor slide valve to load and unload the compressor. In addition to a first solenoid operated control valve selectively connecting the slide valve actuator to compressor high side pressure to effect loading of the compressor and a second solenoid operated control for connecting the slide valve actuator to the compressor low side pressure to effect unloading, a tracking valve responsive to engine acceleration and deceleration connects the slide valve actuator to the low side pressure during engine acceleration for immediate unloading of the compressor and connects the slide valve actuator to the high side pressure during engine deceleration to immediately load the compressor.

10 Claims, 8 Drawing Figures

SCREW COMPRESSOR SLIDE VALVE ENGINE RPM TRACKING SYSTEM

FIELD OF THE INVENTION

This invention relates to vehicle engine driven helical screw rotary compressors and, more particularly, to a control system for momentarily immediately loading and unloading the compressor during periods of engine deceleration and acceleration, respectively.

BACKGROUND OF THE INVENTION

Motor vehicles have incorporated vehicle air conditioning systems involving a compressor driven by the vehicle engine. In large multi-passenger vehicles such as buses, attempts have been made to employ helical screw rotary compressor driven air conditioning systems with the helical screw compressor being mechanically driven by the bus diesel engine or the like through a conventional belt drive. The helical screw rotary compressor incorporates a longitudinally shiftable slide valve for loading and unloading the compressor, wherein the slide valve, which forms a part of the envelope for the compression process, shifts longitudinally to permit more or less of the compressor working fluid in gaseous form to return uncompressed to the suction side of the machine, depending upon system requirements. Further, conventionally, the slide valve itself is mechanically coupled to a linear fluid motor or slide valve actuator such as a piston slidable within a cylinder. Compressed working fluid may be applied to one face of the piston remote from the slide valve, while the opposite face is open to the compressor discharge pressure. As such, the compressor discharge pressure tends to shift the slide valve towards an extreme unload position, while the application of high side discharge working fluid to the opposite side of the piston causes the piston to force the slide valve towards full load position.

Further, in order to control desired loading and unloading, the fluid line leading to the cylinder chamber on the side of the piston opposite that bearing compressor discharge gas, may be selectively opened to the compressor discharge gas or to suction gas, that is, the high and low side working fluid, by suitable load and unload solenoids within respective lines leading from that cylinder to the discharge and suction gas sides of the compressor itself.

This control scheme is not only applied to vehicle air conditioning systems employing engine driven helical screw rotary compressors, but in gas systems generally, which employ a helical screw rotary compressor slide valve for controlled loading and unloading of the compressor. However, in order to insure that the vehicle engine is not overloaded during periods of necessary acceleration, there exists the requirement of some form of compressor slide valve response to varying bus engine speed. As the bus engine accelerates, the compressor must unload essentially immediately, while as the bus engine decelerates, the compressor may be loaded essentially immediately without adverse effect to the vehicle operation.

It is, therefore, an object of the present invention to provide an improved vehicle engine driven air conditioning system which permits rapid compressor unloading during bus engine acceleration and instantaneous momentary compressor loading during bus engine deceleration.

It is a further object of the present invention to provide such improved air conditioning system involving a helical screw rotary compressor bearing an unloading slide valve which is responsive to changing evaporator temperature or changing condenser temperature to provide the high rate of response desired during engine RPM change.

SUMMARY OF THE INVENTION

These objects are obtained for a vehicle engine driven compressed gas refrigeration system which includes an engine driven helical screw rotary compressor having a low side, suction pressure inlet and a high side, discharge pressure outlet. A longitudinally shiftable slide valve is mounted to the compressor for unloading the compressor and shiftable between full load and full unload positions. A slide valve actuator operatively coupled to the slide valve effects shifting of the slide valve between the full load and full unload positions. First control valve means selectively connects the slide valve actuator to the high side compressor discharge pressure outlet to effect compressor loading and second control valve means selectively connects the slide valve actuator to the low side pressure suction inlet to effect unloading of the compressor. The improvement comprises a tracking valve responsive to engine acceleration and deceleration for connecting the slide valve actuator to the low side pressure compressor suction inlet during engine acceleration to immediately unload the compressor and to connect the slide valve actuator to the high side pressure compressor discharge outlet during deceleration to immediately, momentarily load the compressor.

In one form, the first and second control valve means may comprise a solenoid operated pilot valve shiftable between two extreme positions, one of which causes a reduced compressor discharge pressure to be applied to one end of a tracking valve spool and compressor suction pressure to be applied to the other end of the valve spool. This shifts the valve means to a position where a reduced compressor discharge pressure is applied by the valve spool to the slide valve actuator for causing the slide valve to shift towards compressor loading position or to a second pilot valve position, where suction and discharge pressure are reversely applied to the valve spool to apply suction pressure to the slide valve actuator to cause the slide valve actuator to shift towards full unload position.

The tracking valve valve spool is slidable within a cylindrical cavity whose length exceeds the length of the valve spool. The valve spool includes end lands at respective ends of the valve spool, within first and second chambers of the cylindrical cavity and a second set of spaced intermediate lands, between the end lands, and spaced therefrom. An outlet passage opens at one end to the valve actuator and opens, at the other end, to the center of the cylindrical cavity and to the space intermediate of the second set of lands. A low pressure fluid inlet opens to the cylindrical cavity longitudinally to one side of the outlet passage, and a high pressure fluid inlet opens to the cylindrical cavity, to the opposite side of the outlet passage. With the valve spool in axially centered position, both the low and high pressure fluid inlets are cut off to the outlet passage. Means are provided for spring biasing the valve spool to axially centered position. Control pressure passage means are provided for connecting the first chamber directly to either the low pressure suction side or high pressure discharge side of the compressor and the second chamber through a restriction to said side. The pressure differential across opposite ends lands of the valve spool, within respective first and second chambers causes the valve spool to shift immediately to a position to connect one of the fluid inlets to the outlet passage and to effect immediate loading or unloading of the compressor.

Preferably, the line leading to the second chamber includes a sensitivity adjustment bleed means to vary the control sensitivity of the control signal rate of change emanating from the low or high pressure side of the compressor, to the tracking valve. Further, an equalizer line is preferably connected between the chambers formed between the end lands and the set of intermediate lands to equalize the chamber pressure on the faces of the end lands remote from those faces open to the control passage pressure means leading to the chamber from the compressor low or high pressure side thereof.

DESCRIPTION OF THE PREFERRED EMBODIMENTS

Figure 1:
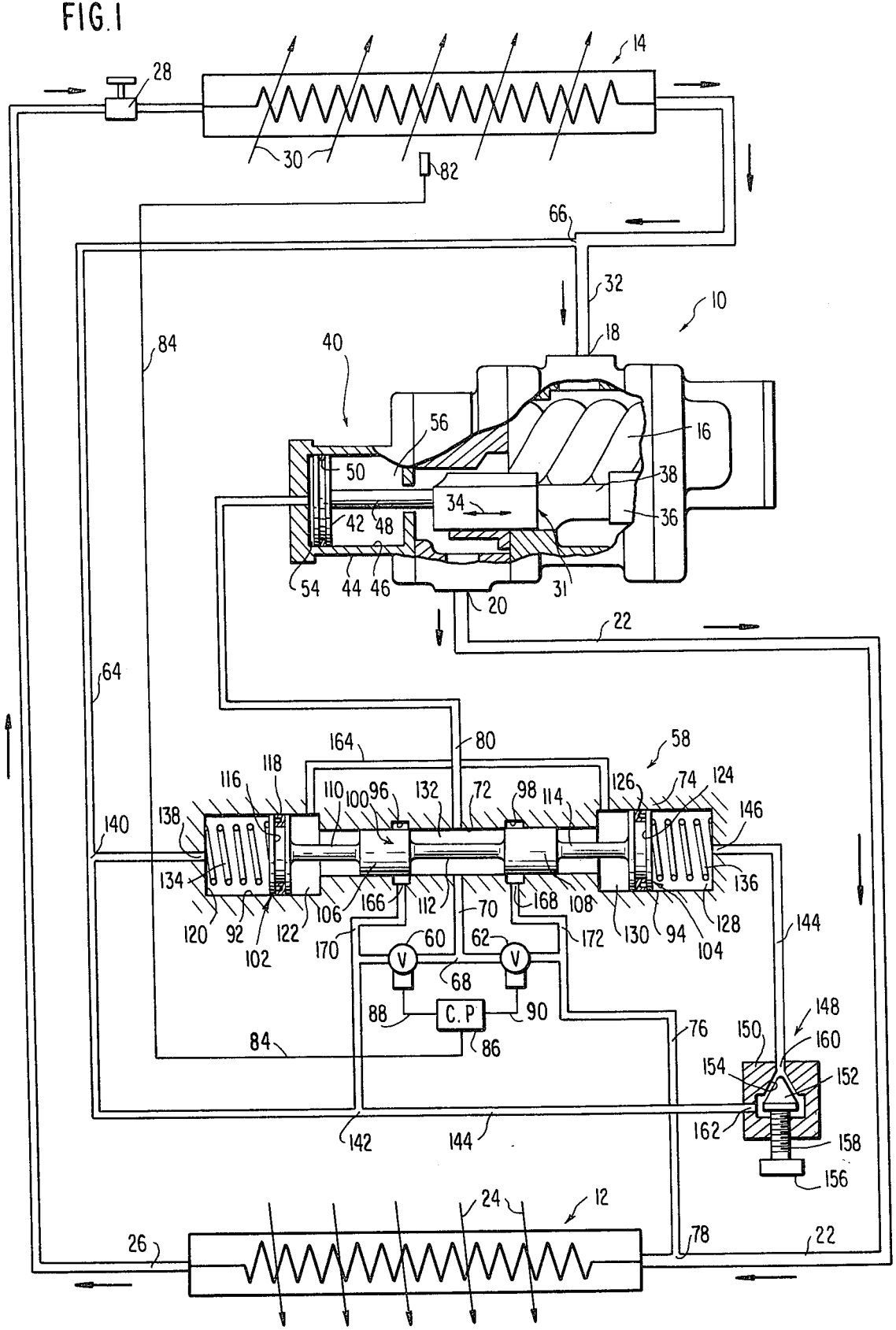
FIG. 1 is a schematic view of the compressor slide valve engine RPM tracking system of the present invention in preferred embodiment for a vehicle air conditioning system under steady speed vehicle cruise conditions.

Referring to FIG. 1, there is shown a preferred embodiment of the invention in which the vehicle engine driven air conditioning system includes a diesel engine or like prime mover driven helical screw rotary compressor indicated generally at 10 and forming one element of a closed refrigeration loop. Further included is a condenser indicated generally at 12 and an evaporator indicated generally at 14. Conventionally, a low pressure refrigerant such as R12 is loop circulated, being compressed by the helical screw compressor 10 via intermeshed helical screw rotors 16 driven by the engine. The refrigerant in vapor or gas form at low pressure enters a suction port or inlet 18 of the compressor, is compressed by the helical screw rotors 16 and is discharged at high pressure from the compressor by way of a discharge port or outlet 20. The compressor discharge line 22 connects directly to the condenser 12, wherein the high pressure compressed refrigerant gas is condensed to liquid form, with the heat rejected to the outside ambient by the passage of air as indicated by arrows 24, over the condenser 12. The liquid refrigerant, at high pressure, is directed by way of line 26 to the inlet side of the evaporator 14. The expansion of the refrigerant at the evaporator is controlled in a conventional manner by a thermal expansion valve 28 within line 26 at the inlet end of the evaporator 14. The evaporator 14 is within duct means (not shown) in an air return path from the vehicle passenger compartment which may be a bus or other multi-passenger commercial vehicle. The return air enters from a warm air inlet and passes over the evaporator coil 14 as indicated by arrows 30 wherein heat is extracted from the warm air by vaporization of the liquid refrigerant within the evaporator of closed loop with the cooled air returned to the passenger compartment of the vehicle.

The refrigerant, now in low pressure gaseous form, returns to the suction port 18 through suction line 32, which line connects at the suction port 18 to the compressor at one end and, at its other end, to the outlet end of the evaporator coil 14.

In order to control the amount of refrigerant being compressed, and thus loading and unloading of the compressor in response to the need for cooling of the air passing to the passenger compartment and over coil 14, as evidenced by arrows 30, the helical screw rotary compressor includes, in conventional fashion, an unloading slide valve, indicated generally at 31. It forms a part of the envelope surrounding the intermeshed helical screw rotors 16. The slide valve is longitudinally or axially slidable as indicated by the double headed arrow 34 towards and away from a fixed stop 36 which determines the fully loaded position of the compressor and the position wherein the suction or inlet gas is prevented from returning uncompressed to the suction side of the machine through a gap 38 between the slide valve 34 and stop 36. The slide valve 34 is shifted longitudinally by a slide valve actuator indicated generally at 40 comprising a linear fluid motor. It is formed by a piston 42 sealably mounted within a cylinder 44 whose cylindrical cavity 46 is of a diameter slightly larger than the diameter of the piston 42. The piston 42 is directly fixed to the slide valve 34 by way of piston rod 48. The piston 42 preferably carries a ring seal 50 mounted within a groove 52 on its periphery. The piston 42 slides within the cylindrical cavity 46 and forms with that cavity 46 chamber 54 remote from the slide valve 34 and chamber 56 on the side proximate to that slide valve. Chamber 56 is open to the discharge pressure of the compressor such that normally the piston 42 is driven to the left such that the slide valve 34 is in full unload position, absent a relatively large fluid pressure existing within the opposite chamber 54.

Conventionally, particularly where the helical screw rotary compressors are oil flooded, the oil which is separated from the working fluid downstream of the compressor and which is at compressor discharge pressure is employed as the motive fluid for driving the linear motor to force the slide valve 34 towards the fully loaded position, that is, with the ends of the slide valve abutting stop 36 in closing off gap 38. By properly proportioning the effective surface area on opposite sides of piston 42, oil at compressor discharge pressure or the same compressor discharge fluid itself may be supplied to chamber 54 to shift the slide valve from the unload position toward the fully loaded position, that is, from left to right. This is the case in this embodiment of the invention. Also, in this embodiment, in order to shift the slide valve 34 in the opposite direction, that is, away from stop 36 and towards the full unload position, chamber 54 is opened to compressor suction pressure, causing a rapid shift of the slide valve 34 from right to left.

The present invention is directed to a slide valve engine RPM tracking system for an engine driven helical screw compressor type air conditioning system, although the invention has broader application to systems where an unloading valve is shiftable between positions and is responsive to engine acceleration and deceleration for immediately unloading, and unloading the compressor, respectively. The embodiment of the invention shown in FIG. 1 employs a spool type tracking valve indicated generally at 58 for accomplishing that purpose. However, in addition to the utilization of the tracking valve 58 as the means for controlling the position of slide valve 34, the system employs a pair of solenoid operated control valves comprising an unload solenoid operated control valve 60 and a load solenoid operated control valve 62. Valve 62 functions to selectively control the application of high pressure discharge gas from compressor outlet line 22 to the slide valve actuator control chamber 54. By the energization of solenoid operated control valve 60, the suction pressure of inlet 32 is applied to that same chamber 54.

Suction gas pressure control line 64 is connected, at one end 66, to the suction line 32 upstream of suction port 18 and is connected at 68 to a common inlet passage 70 opening to a cylindrical bore 72 within tracking valve casing or housing 74 of the tracking valve 58, at the center of that bore. The unload solenoid operated control valve 60 is incorporated within line 64 just upstream of the connection point 68 to the common inlet passage 70. In similar fashion, a discharge gas pressure control line 76 is connected, at one end, to the discharge line 22 at point 78 and is connected at 68 to the common inlet line 70. Line 76 bears the load solenoid operated control valve 62.

Diametrically opposite the point where the common inlet line 70 enters bore 72, an outlet passage 80 is provided to the system having one end opening to the cylindrical bore 72, at an axially centered position, and opening at its opposite end directly to chamber 54 of the slide valve actuator 40. As may be appreciated, by energization of the load solenoid operated control valve 62, high pressure discharge gas may be fed directly by way of discharge gas pressure control line 76, via the tracking valve 58 and passages 70 and 80, to the slide valve actuator chamber 54 for driving slide valve actuator piston 42 to the right, tending to load the compressor 10.

To the contrary, with control valve 62 de-energized, energization of the unload solenoid operated control valve 60 causes chamber 54 to see a very reduced gas pressure, that is, the pressure of the working fluid at the suction or low pressure side of the machine, since line 64 connects to the suction line 32 upstream of suction port 18. The pressure differential across the piston 42 causes the piston 42 to rapidly shift to the left, rapidly unloading the compressor.

While conventionally slide valve control may be effected by sensing conditions at either the high side or the low side of the system, that is, either at the evaporator 14 or the condenser 12, the illustrated embodiment of the invention employs a thermostat 82 positioned within the warm air inlet to the evaporator 14, that is upstream of the air flow over the evaporator coil and prior to cooling of the air returning to the passenger compartment. The thermostat 82 is connected by way of electrical line 84 to a control panel C.P. indicated schematically in block form at 86, the control panel 86 including a source of voltage (not shown) and permitting, depending upon the temperature sensed by thermostat 82, the selective energization of solenoid operated control valves 60 and 62 for unloading and loading, respectively, compressor 10. In that respect, the unload solenoid operated control valve 60 is connected to the control panel 86 by way of line 88 while line 90 connects that same control panel to load solenoid operated control valve 62. Valves 60 and 62 are normally closed valves which open upon energization thereof.

The tracking valve 58 comprises a balanced spool valve with a valve spool normally is maintained in an axially centered position absent vehicle engine acceleration and deceleration to some significant degree. The cylindrical bore 72 is of given diameter within valve casing 74. At respective ends of the bore 72, there are provided counterbores as at 92 and 94, the counterbores being closed off at their ends and forming enlarged diameter chambers to the left and right of bore 72. Bore 72 bears intermediate its ends, axially spaced annular grooves, as at 96 and 98. The tracking valve 58 utilizes an axially slidable valve spool indicated generally at 100 having an axial length less than the combined axial length of bore 72 and counterbores 92 and 94. The spool valve 100 is comprised of end lands as at 102 and 104, to the left and right, respectively. Land 102 is of a diameter slightly less than the diameter of counterbore 92 and is slidably positioned therein, while land 104 is of a diameter slightly less than the diameter of counterbore 94 and is slidable within that counterbore. The valve spool 100 is further formed with a pair or set of intermediate lands as at 106 and 108 having diameters slightly less than the diameter of bore 72 and being sealably and slidably mounted within that bore 72. Lands 102 and 106 are separated by a reduced diameter valve spool portion 110. The intermediate lands 106 and 108 are separated by a similar size reduced diameter portion 112, and the intermediate land 108 and end land 104 are separated by a third reduced diameter portion 114.

Thus, there are formed annular spaces or cavities, between the respective lands. Land 102 bears a peripheral groove as at 116, within which is positioned a C-ring seal 118 so as to seal off opposite sides of the land 102, thereby forming a chamber 120 on the left side of land 102 and, partially, a chamber 122 on the right side. Chamber 122 is formed by a portion of counterbore 92 and a portion of bore 72. Similarly, land 104 bears a peripheral groove 124, within which is positioned a ring seal 126 sealing the periphery of land 104 and counterbore 94, the land 104 defining with counterbore 94 an axially outside chamber 128 to the right of land 104 and on the left of that land, partially forming a second chamber 130. Chamber 130 is partially within counterbore 94 and a part of bore 74, between land 104 and the right hand intermediate land 108.

An annular chamber 132 is formed between intermediate lands 106 and 108 and within the axial bore 72. Chamber 120 bears a helical coil spring 134, while to the opposite side of the assembly and within chamber 128 is provided an identical, equal strength, helical coil spring 136. The coil springs normally tend to axially center the valve spool 100. An axial passage 138 opens to chamber 120 and is connected to the compressor suction pressure control line 64 at point 140 such that chamber 120 sees directly and unimpededly, the compressor suction pressure. At point 142, within the same control line 64, a further control line 144 extends to axial passage 146 within valve casing 74, opening to chamber 128. Line 144 may be similarly sized to line 64, and as illustrated, bears a sensitivity adjustment bleed valve indicated generally at 148 whose function is to provide an adjustable bleed for the pressure fluid emanating from the suction or low side of the compressor and directed to chamber 128 within which end land 104 resides. Bleed valve 148 controls the signal rate of change applied to chamber 128 and provides a pressure differential during engine acceleration and deceleration between chamber 128 and 130 as seen by respective end lands 102 and 104 having corresponding sized surface areas.

The sensitivity adjustment bleed valve 148 within line 144 comprises a valve block or casing 150, bearing a cavity 154 of conical form, within which is positioned a threadably shiftable conical valve member 152 tending to close off the conical valve cavity 154 by rotation of knob 156 exterior of the valve block 150. Knob 156 is fixed to the threaded shaft 158, whose opposite end bears the conical valve member 152. Thus, by rotating knob 156, the conical valve member 152 may be screwed down closer to the conical cavity 154 within which valve member 152 resides so as to close off an axial outlet port 160 of adjustable bleed valve, to radial inlet port 162, by a predetermined degree. This limits the rate of flow of gas through line 144 to chamber 128. Thus, the adjustable bleed valve acts as a variable fluid impedance to the gas flow directed to chamber 128, while gas flow from the suction side of the machine, which is common to both chambers 120 and 128, flows unimpeded to chamber 120. Alternatively, line 144 may comprise a capillary tube or restricted passage so as to insure a predetermined pressure differential between chambers and across lands 102/104 responsive to the degree of change in pressure at the suction side of the machine in response to engine acceleration or deceleration.

Further, while a single adjustable bleed valve, i.e. restriction, is shown within line 144 leading to chamber 128, there may in fact be provided dual restrictors within parallel lines between chamber 128 and point 142 opening to line 164 with those parallel lines including appropriately, check valves opening in opposite directions. Thus, during deceleration, there could be a different signal rate of change for control of the tracking valve to that occurring during acceleration, one being the rate of change of flow from the chamber 128 as a result of suction pressure drop, while the other involves the rate of change of flow to the chamber 128 (relative to chamber 120), due to suction pressure increase.

The tracking system is further provided with an equalizer line 164 which is a small diameter passage within the valve casing 74 opening at one end to chamber 122 and at the opposite end to chamber 130 such that, during shifting of the valve spool 100 in either direction, any captured fluid can flow between chambers 122 and 130 as one chamber expands and the other decreases in size due to the shift of the spool valve 100.

An important aspect of the present invention is the nature of very quickly and immediately effecting slide valve displacement in response to engine acceleration and deceleration. In that respect, in this embodiment, the valve casing is provided with two additional inlet ports, a low pressure fluid inlet port 166 and a high pressure fluid inlet port 168 which open to bore 72, via grooves 96, 98 respectively, and which are axially spaced to opposite sides of outlet passage 80 at equal distances and with the distance therebetween corresponding to a dimension in excess of the spacing between the opposed faces of valve spool intermediate lands 106, 108. As may be appreciated in FIG. 1, with the valve spool 100 centered, chamber 132 is cut off from both low pressure fluid inlet port 166 and high pressure fluid inlet port 168. Port 166 is connected to line 64 downstream of the unload solenoid operated control valve 60 via a low pressure fluid inlet passage 170, while high pressure inlet port 168 is connected to line 76 via high pressure fluid inlet passage 172 which connects to line 76 upstream of load solenoid operated control valve 62.

In FIG. 1, the system is illustrated under steady cruise conditions for the vehicle with the engine neither accelerating nor decelerating. Further, at that moment, there is no appreciable increase or decrease in the temperature of the warm air returning to the evaporator for cooling prior to return to the vehicle passenger compartment. Thus, solenoid operated valves 60 and 62 are de-energized and piston 42 of the slide valve actuator has the slide valve in a position such that the compressor is partially loaded to meet the particular demands at that moment for cooling of the passenger compartment. Chambers 120 and 128 of the tracking valve are at equal pressure. The valve spool 100 is centered.

Figure 2:
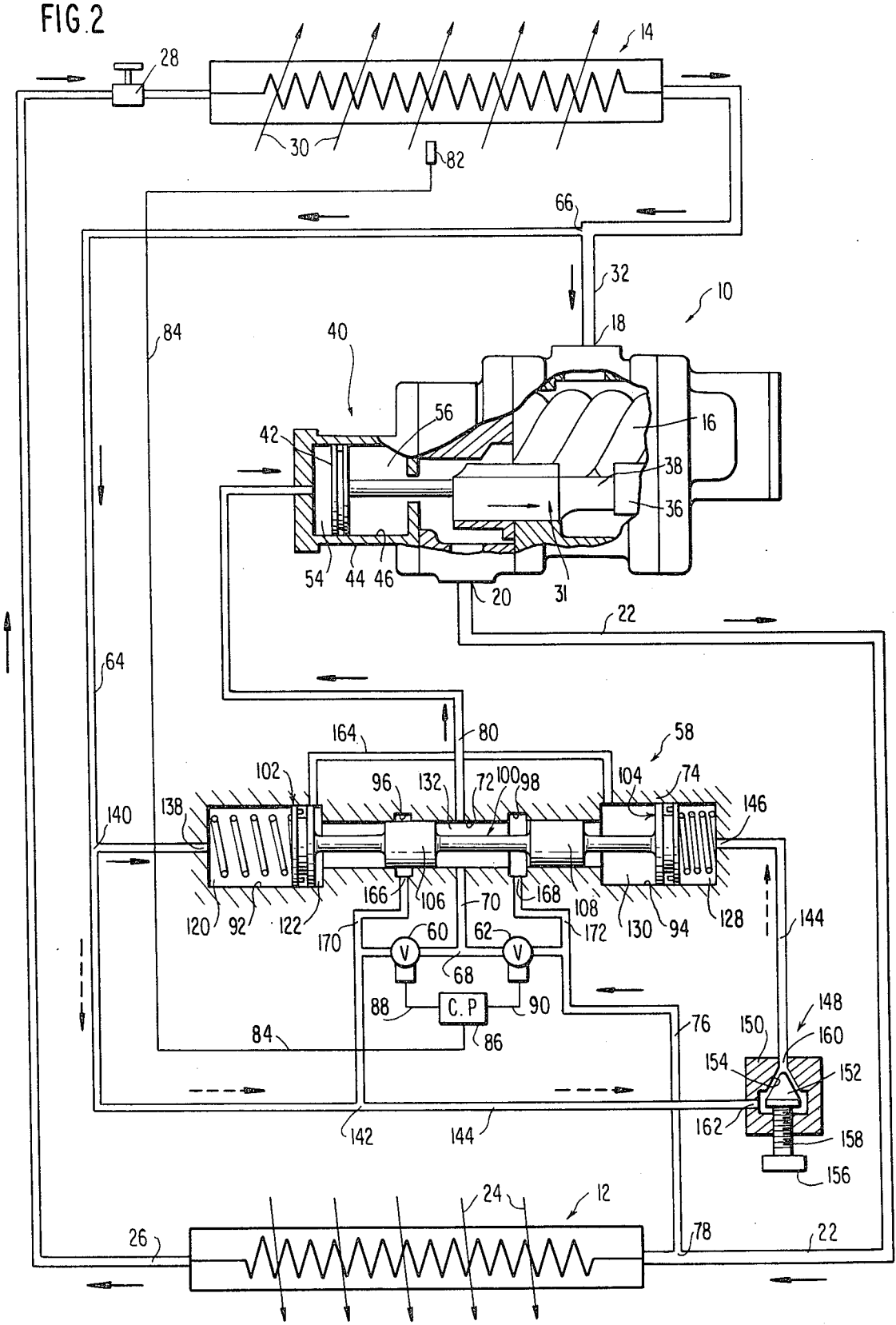
FIG. 2 is a schematic view of the system of FIG. 1 under vehicle engine deceleration, compressor loading conditions.

Turning to FIG. 2, the tracking system of FIG. 1 is illustrated under conditions involving the vehicle engine deceleration, requiring the loading of the compressor to meet the air conditioning demand for the passenger compartment of the vehicle due to engine speed drop and thus compressor rotor speed drop. This causes, automatically, an increase in the pressure of the suction gas returning from the evaporator 14 to the suction port 18 via suction line 32. This increased pressure is directly transmitted to chamber 120, where as may be appreciated the increased pressure is applied against the left face of land 102, while due to the placement of the bleed valve 150 within line 144, this pressure change is only slowly transmitted to corresponding chamber 128 on the right side of the tracking valve 58. The valve spool 100 moves left to right, thereby displacing chamber 132 to the right, to the point where the outlet passage 80 opens to the high pressure fluid inlet port 168. The high pressure discharge gas now flows from passage 172 into the chamber 132, filling the same, with this fluid escaping through the outlet passage 80 to chamber 54 on the left side of slide valve acuator piston 42, driving the piston from left to right and shifting the slide valve towards the full load position. The result is loading of the compressor to meet the air conditioning demand of the system inspite of vehicle engine deceleration and reduction in speed of the compressor helical screw rotors 16.

Meanwhile, although chamber 122 has its volume diminished and chamber 130 has its volume increased, the equalizer line assures equalization in pressure between these chambers.

Figure 3:
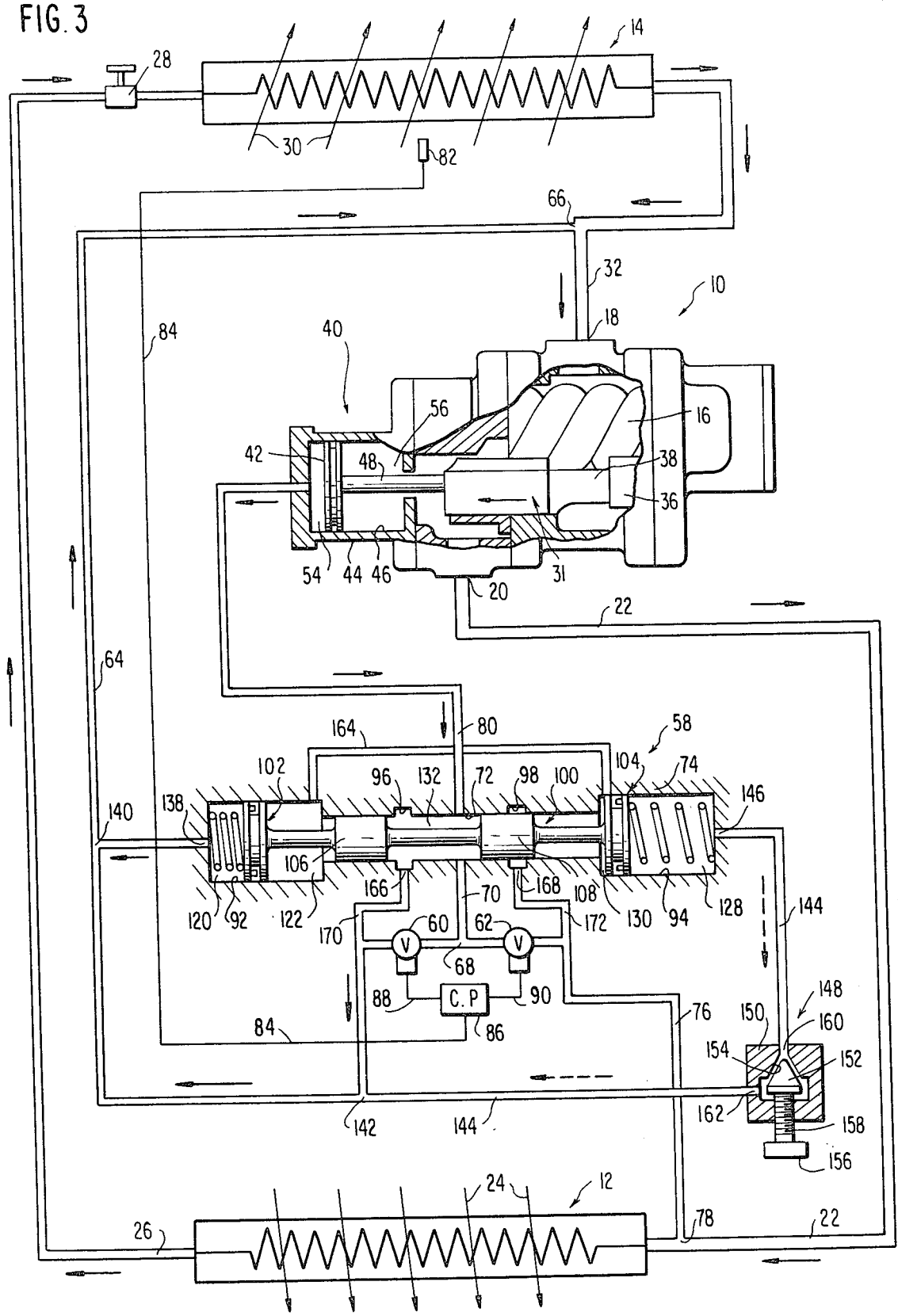
FIG. 3 is a schematic view of the system of FIG. 1 under vehicle engine acceleration, compressor unloading conditions.

Turning next to FIG. 3, the opposite is true during vehicle engine acceleration. During engine acceleration, the helical screw rotors 16 are driven at a higher speed. However, to meet the existing demand for cooling of the passenger compartment, because of the increased speed of rotation of the compressor helical screw rotors 16, there is required the necessity of unloading the screw compressor by shifting of the unloading slide valve 32 to the left. This is achieved because of a pressure reduction in the suction or low side of the compressor, that is, within line 32, which lower pressure is transmitted immediately directly to chamber 120. While the gas pressure within chamber 128 starts to decrease, because of the restriction provided by the sensitivity adjustment bleed valve 148, there is a pressure differential across the tracking valve and between lands 102, 104, tending to shift the valve spool 100 from right to left to the extent where the low pressure port 166 is open to chamber 132 and thus the low side pressure is immediately directed to chamber 54 on the left side of the slide valve actuator piston 42. With the opposite side of the slide valve actuator piston 42 and specifically chamber 56 at discharge pressure, the slide valve actuator piston 42 and the slide valve 32 move rapidly from right to left to rapidly unload the machine and to meet the system demand during vehicle engine acceleration and increased speed of the intermeshed helical screw rotors 16.

Figure 4:
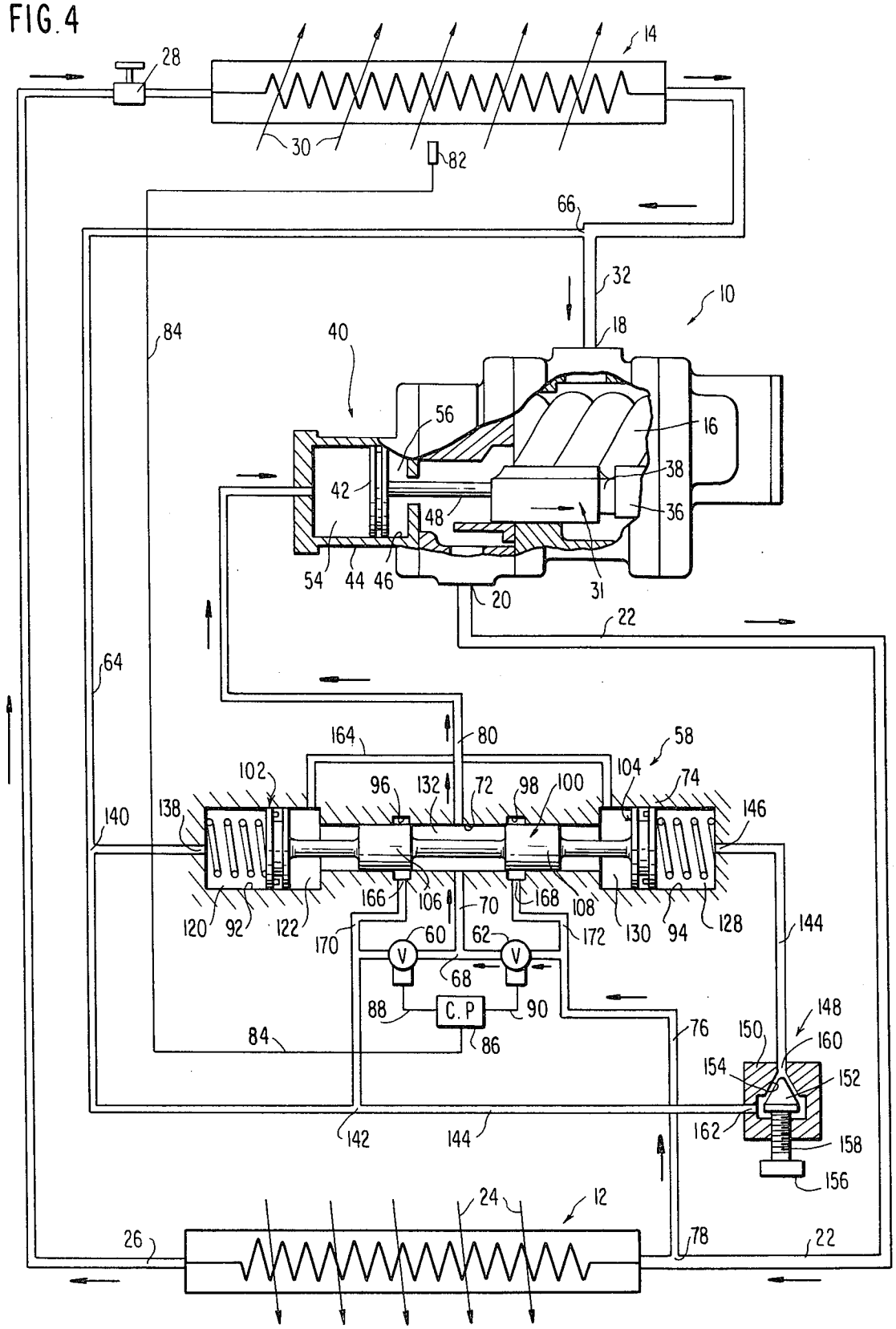
FIG. 4 is a schematic view of the system of FIG. 1 under conditions wherein the evaporator warm air inlet temperature rise causes increased compressor load.

In terms of conventional operation of the air conditioning system, absent the automatic operation of the tracking system tracking valve, further reference to FIG. 4 shows operations under assumed steady vehicle engine speed conditions where the evaporator warm air inlet temperature rises, indicating a need to further cool the air in the passenger compartment by loading of the compressor. Under such conditions, the thermostat 82 functions to cause an electrical voltage to be applied through line 90 to the load solenoid operated control valve 62 to open that valve 62 and permit high pressure discharge gas, via lines or passages 22, 76, 70 and 80, to pass to the slide valve actuator chamber 54 to the left side of piston 42. This causes that piston and its slide valve to drive from right to left to thereby load the machine. This tends to close the gap 38 which normally permits a major part of the suction gas to return to the suction side of the machine without compression.

It may be appreciated, FIG. 4, that the spool valve 100 remains centered since there is no engine acceleration or deceleration and since conditions have been building up slowly to the extent where the thermostat 82 functions to provide the control signal to cause a change in loading of the compressor. It is true that the suction temperature and therefore the suction pressure is increased for the working fluid passing to the suction or low side of the machine. However, this increase is not a sudden increase as a result of vehicle engine speed rapid change. It is a result of a long time constant change of the temperature within the passenger compartment, which long time constant pressure change is reflected over a period of time to both chambers 120 and 128 of the tracking valve. The valve spool 100 remains axially centered, positioned by the coil springs 134, 136 and the equal pressures within opposed chambers 120 and 128 of that system element. When the passenger compartment is sufficiently cooled down, the warm air inlet temperature drops, thermostate 82 causes a control signal change terminating the voltage supply via line 90 to the load solenoid operated control valve 62, cutting off the high pressure supplied to chamber 54 to terminate further loading of the machine. The system may then experience a steady state vehicle cruise condition, such as that of FIG. 1 prior to a further change.

Figure 5:
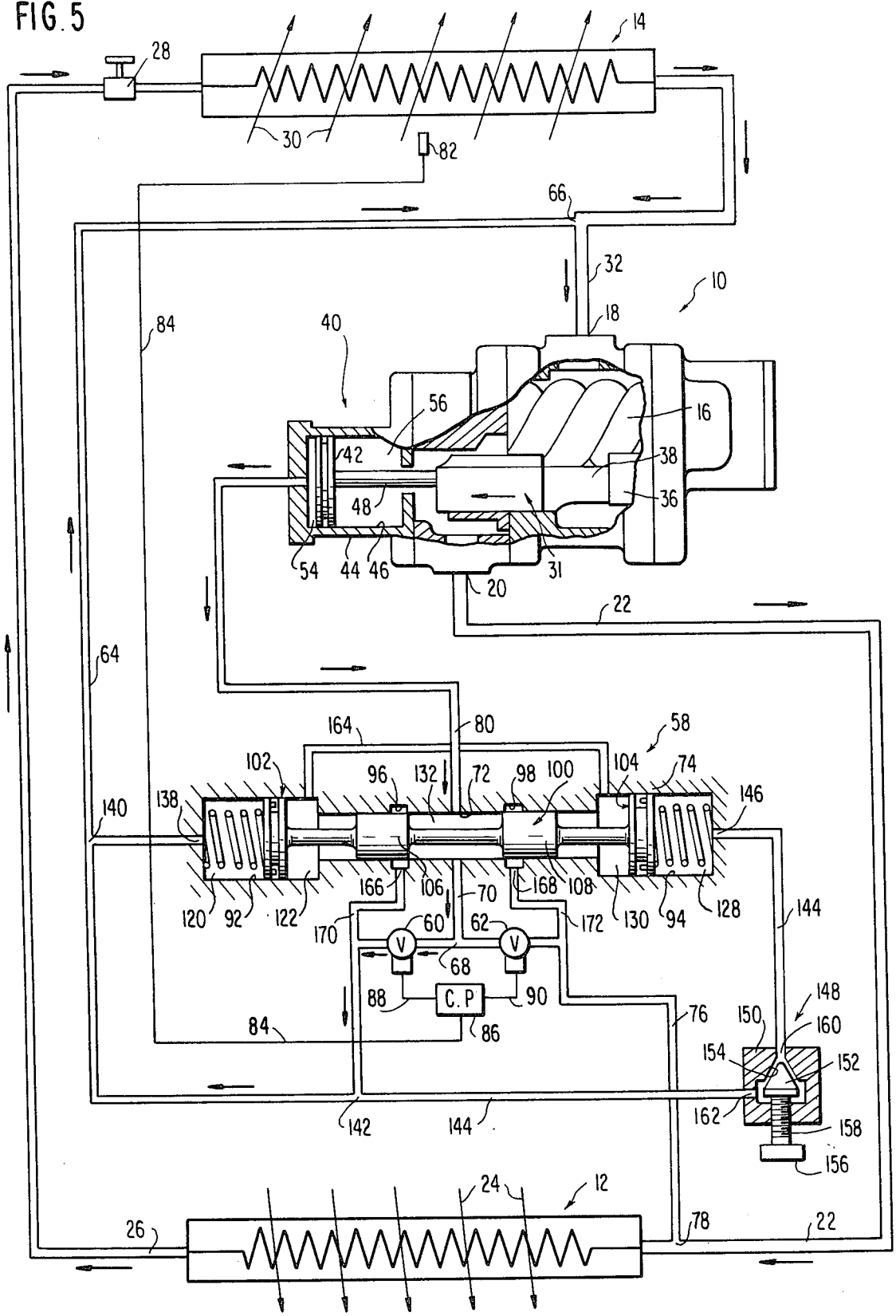
FIG. 5 is the system of FIG. 1 under conditions of evaporator warm air inlet temperature drop, with compressor unloading.

However, a situation as illustrated in FIG. 5 may develop wherein there is a drop in the evaporator warm air inlet temperature sensed by the thermostat 82 under conditions in which the vehicle engine is neither accelerating nor decelerating, and wherein there is a requirement to unload the compressor to prevent a reduction in the cooled air at the passenger compartment below a predetermined comfort level.

In response to the thermostat 82 sensing the reduction in return cooling air inlet temperature, a signal is supplied to the unload solenoid operated control valve 60 via line 88 from the control panel 86 opening that valve and permitting directly, the flow of low pressure gas to chamber 54, creating the desired pressure differential across opposite sides of the slide valve actuator piston 42 to shift the piston rapidly from right to left, thereby unloading the compressor.

In response to increase in the warm air inlet temperature, the solenoid operated control valve 62 is de-energized with the compressor at a proper, less loaded condition with the slide valve 32 shifted from right to left.

Figure 6:
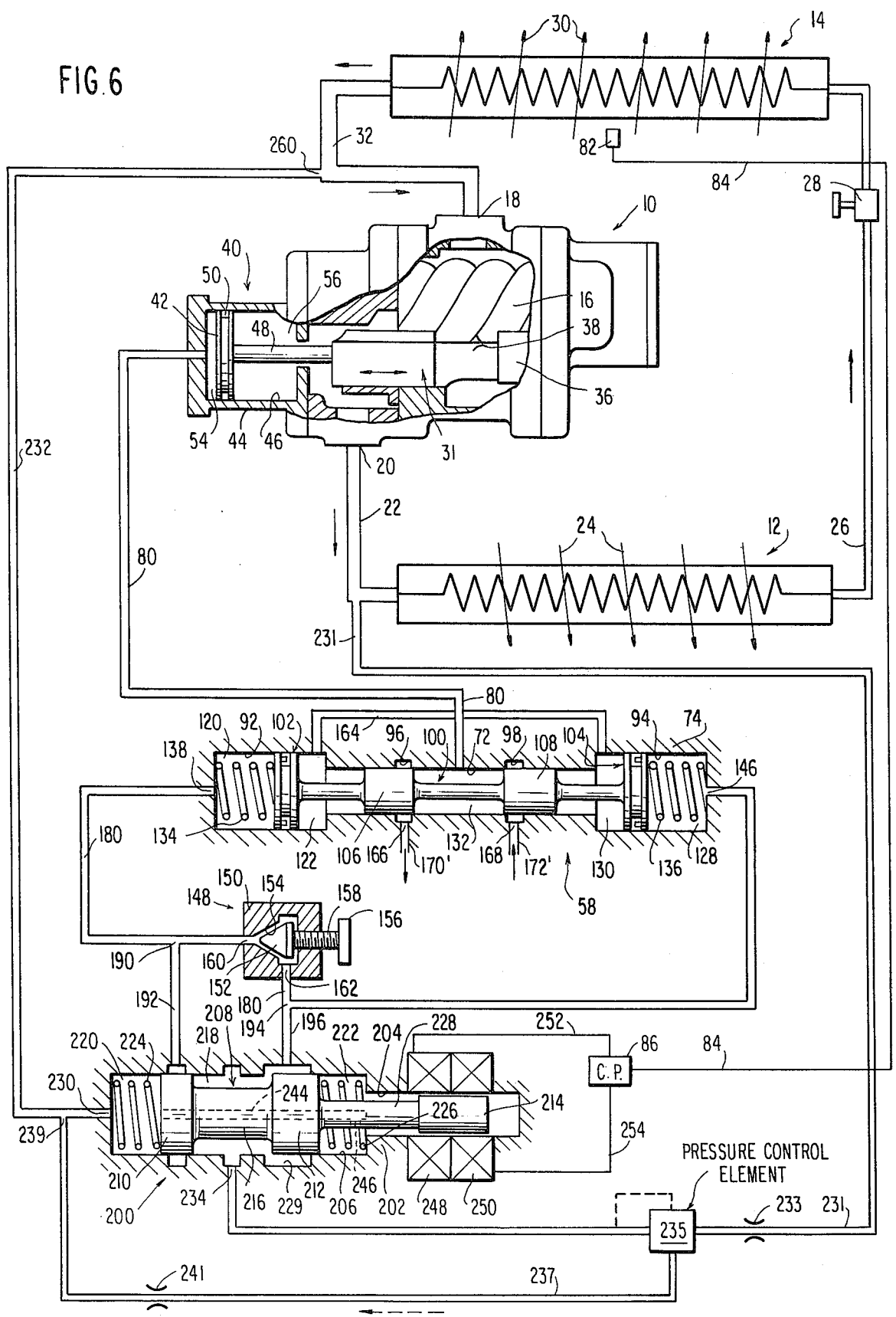
FIG. 6 is a schematic view of a driven compressor slide valve engine RPM tracking system for a vehicle refrigeration system forming a second embodiment of the present invention, in holding mode, responding to quick charge in discharge pressure.

Referring next to FIG. 6, there is shown the second embodiment of the helical screw compressor slide valve engine RPM tracking system, wherein elements identical to those in the first embodiment, FIGS. 1-5 inclusive, bear like numerical designations. In this respect, as indicated generally, the bus or other vehicle air conditioning system is of the closed loop type including a compressor 10, a condenser 12 and an evaporator 14. Appropriately, they are connected in a serial loop by way of discharge line 22 connected at discharge port 20 of the compressor, at one end, and connected to the inlet side of the condenser 12 at its other end, line 26 connecting the outlet side of the condenser 12 to the inlet side of the evaporator 14, via the thermal expansion valve 28, and suction line 32 leading from the outlet side of the evaporator 14 to the suction port 18 of the compressor 10. The system employs tracking valve 58 of identical construction and form to that illustrated in the first embodiment including the axially slidable valve spool 100 bearing end lands 102 and 104 at opposite ends and positioned within respective counterbores 92 and 94, while bearing smaller diameter, intermediate lands 106 and 108 within bore 72 of valve casing 74.

Unlike the prior embodiment, low pressure fluid inlet line 170' may be connected to the low pressure side of the compressor, as by way of suction line 32 for compressor 10, or alternately, to an oil drain for an oil flooded compressor. Further the high pressure fluid line 172' may be connected to the high side of the compressor, i.e., the discharge line 22 upstream of condenser 12 or to a high pressure oil supply line downstream of an oil separator (not shown) and within the refrigeration loop itself.

Although the system may operate on the basis of sensing a temperature other than the inlet air temperature to the evaporator 14 prior to passage of the air cooled by the evaporator 14 to the passenger compartment of the vehicle, the thermostat 82 is placed in the same position as the first embodiment and senses the warm air at the inlet to the evaporator. Electrical line 84 leads from the thermostat 82 to the control panel 86.

The system is somewhat different in a number of respects, principally by the utilization of a solenoid operated pilot valve 200 for selectively controlling the the position of the valve spool 100 of the tracking valve to further effect displacement of the slide valve actuator piston 42. The tracking valve spool also shifts automatically to effect tracking valve spool movement in response to engine acceleration and deceleration for fast unloading and loading of the screw compressor, respectively.

In that respect, the spring centered three position solenoid operated pilot valve 200 comprises a valve casing 202 provided in turn with a bore 204 and a counterbore 206 of limited length. The bore 204 and counterbore 206 house a valve spool indicated generally at 208 including axially spaced lands 210 and 212, of a diameter on the order of the counterbore 206 and slidably and sealably mounted therein. The axial extent of the valve spool occupied by lands 210 and 212 and separated by a reduced diameter portion 216 is less than the axial length of counterbore 206, thereby forming opposed chambers 220 and 222 within the counterbore 206 at the ends of lands 210 and 212, respectively. Positioned within the chambers 220 and 222 are coil springs 224 and 226 bearing on respective lands 210 and 212 and tending to center the valve spool in the position shown in FIG. 6. The valve spool includes a further reduced diameter portion 228 projecting axially from land 212 and terminating in a magnetic core portion or solenoid armature 214 for a solenoid further comprised of abutting solenoid coils 248 and 250 which surround counterbore 204. Chamber 220 opens by way of axial passage 230 to a line 232 connecting at point 260 to the suction side of the compressor and specifically at suction line 32. Thus, chamber 220 is always at compressor suction pressure.

Further, the valve spool 208 bears an axial bore 244 from one end through land 210, intermediate reduced diameter portion 216, land 212 and through a given portion of reduced diameter portion 228 where it meets radial passage 246 opening to the periphery of the reduced diameter portion 228 and thus to chamber 222. Chambers 222 and 220 are thus at essentially the same pressure which is the suction pressure of the compressor. The solenoid operated pilot valve 200 is further provided with a reduced discharge pressure control signal inlet passage 234 leading to a chamber 218 formed between the lands 210, 212, by way of a circumferential groove 229 within counterbore 206. Specifically, a restrictor is positioned within a line 231 at 233 upstream from a pressure control element indicated schematically at 235. The control signal inlet passage 234 emanates from the pressure control element 235, while a further line 237 connects the pressure control element through restriction 241 to the suction pressure control signal line 232 at point 239. This insures a reduced discharge pressure being available to the tracking valve absent flow conditions. A larger width axially displaced circumferential groove 229 is formed within counterbore 206, which groove permits when the springs center the pilot valve, fluid communication between passage 234 and passage 196 leading directly to chamber 128 of tracking valve 58 and via sensitivity adjustment bleed valve 148, which is structured similar to and functions identically to that within the first embodiment, to chamber 120 of tracking valve 58.

The main difference here is that passage 196 connects at point 194 to a line 180 bearing bleed valve 148. Line 180 extends to chamber 120 on the left side of the valve spool 100 of the tracking valve 58. Bleed valve 148 includes a tapered valve chamber 154 which is extended by axial outlet 160 and which connects by way of line 180 to axial passage 138 of the tracking valve 58 leading to chamber 120. Line 180 has connected thereto, at point 190, a line 192 leading to a third circumferential groove 238 within counterbore 206, which groove 206 is normally covered by wide land 210 of the pilot valve spool 208. While normally centered as shown in FIG. 6, the pilot valve spool 208 may be shifted to the right or left, by the energization of coils 250 and 248, respectively. Solenoid coil 248 is connected to the control panel and to a source of voltage (not shown) via electrical lines 252, while solenoid coil 250 is connected by way of lines 254 to that same control panel.

The helical screw compressor slide valve engine RPM tracking system of this embodiment functions in the same manner as the prior embodiment, permitting selectively, controlled compressor loading and unloading, by the application of either a high pressure gas or hydraulic fluid to chamber 54 of the slide valve actuator 40 or opening of that chamber to either a low pressure gas, i.e., the system working fluid at the suction side of the compressor, or to a hydraulic fluid drain leading to an oil sump or the like.

Additionally, absent electrical energization of the solenoid coils 248 and 250, the pilot valve remains centered to permit reduced discharge pressure gas to act as a control signal via line passage 234, directly to chamber 128 on one side of the tracking valve and, through a restrictor provided by bleed valve 148, to chamber 120 at the other end of the valve spool 100. The bleed valve controls the rate of pressure change within chamber 120, permitting the valve spool to shift laterally to selectively control rapid compressor loading or or unloading in response to engine deceleration or acceleration, respectively, above a predetermined level.

FIG. 6 illustrates the second embodiment under vehicle steady engine speed cruise conditions with the engine speed constant and without warm air inlet temperature change. The valve spool of pilot valve 200 is centered by the coil springs 224 and 226 such that land 210 closes off line 192 to suction pressure within chambers 220 and passage 232. However, the reduced discharge pressure control signal passage 234 is in fluid communication, by way of groove 230, unimpeded by land 212 to both chamber 128 and 120. Under steady state conditions, there is no pressure differential. However, upon acceleration or deceleration, a pressure differential is experienced across the valve spool 100 of the tracking valve. Assuming, for instance, that the engine accelerates to a significant degree, the discharge pressure rises significantly which increased pressure is reflected immediately to chamber 128. Due to the time constant provided by the adjustable bleed valve 148, chamber 120 sees a rising but somewhat reduced pressure. The pressure differential causes the valve spool 100 to shift to the left, resulting in connecting the low pressure gas or oil drain passage 170' to chamber 54 resulting in an immediate shift of the slide valve 32 from right to left towards the full unload position. This permits the compressor to discharge compressed gas at a lower rate commensurate with the fixed need for cooling within the passenger compartment and to compensate for the fact that the compressor helical screw rotors 16 are rotating at a faster speed corresponding to the accelerated engine speed.

To the contrary, if the vehicle engine decelerates and there is a corresponding drop in the discharge pressure of the compressor, it is reflected immediately within chamber 128, while chamber 120 of the tracking valve has its pressure dropping but at a much slower rate, dependent upon the setting of the bleed valve 148. Upon a predetermined pressure differential between these chambers and across the valve spool 100, the valve spool 100 will shift to the right compressing coil spring 136 and uncovering, by shift of land 108 to the right, the high pressure gas or oil supply port 168 to chamber 132 and thus to passage 80 and chamber 54 of the slide valve actuator 40. The delivery of high pressure discharge gas or oil at a corresponding pressure to chamber 54 causes the piston 42 of the slide valve actuator to shift to the right driving the slide valve 32 towards fixed stop 36, narrowing the gap 38 and causing the compressor to load up. Thus, in response to vehicle engine deceleration, the compressor continues to function to deliver the proper rate of refrigerant to the condenser 12 and thus to the evaporator 14 to maintain constant the refrigeration effect needed for maintaining constant the comfort level of the passenger compartment of the vehicle.

Figure 7:
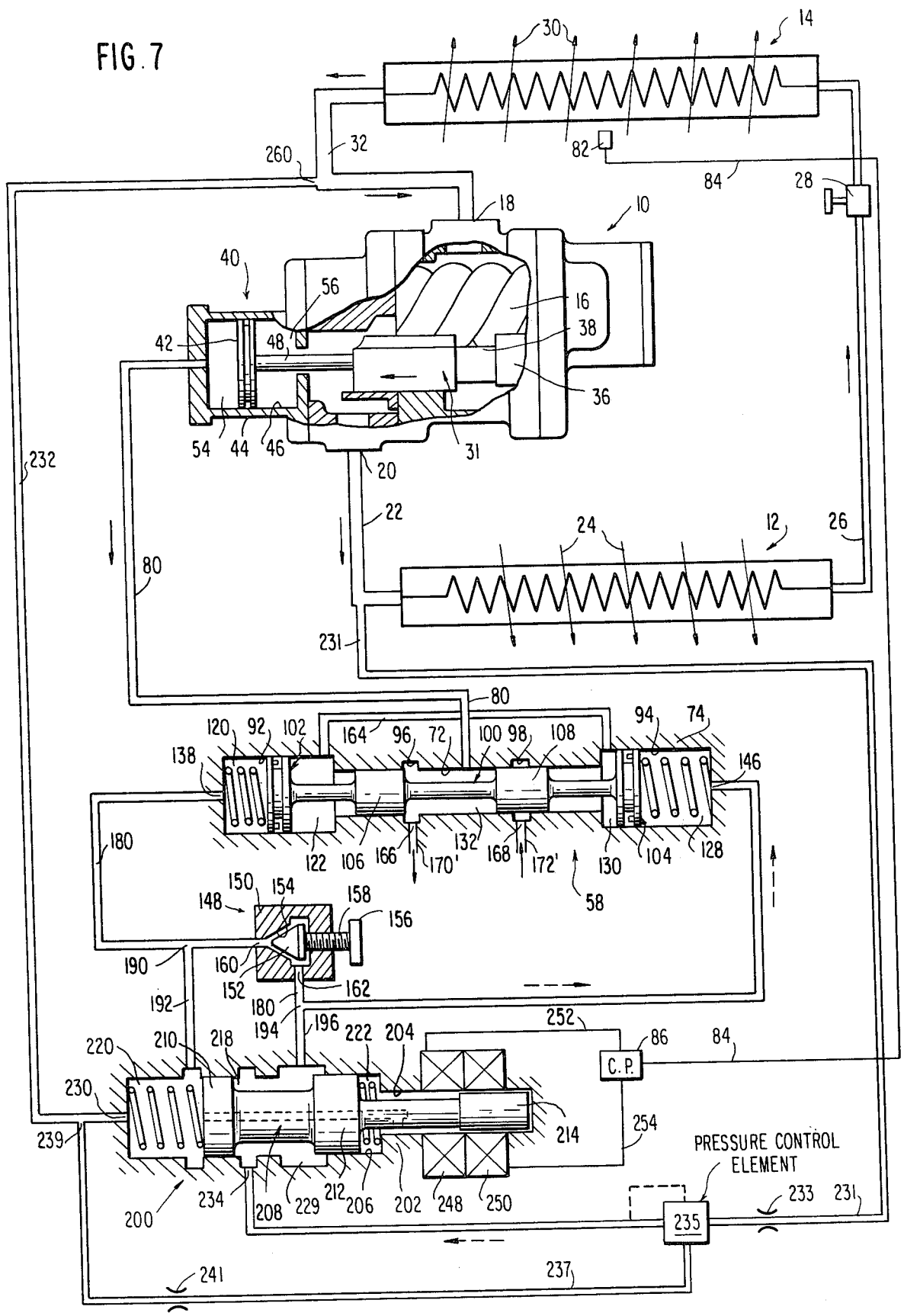
FIG. 7 is a schematic view of the system of FIG. 6 under conditions of evaporator warm air inlet temperature rise resulting in increased compressor load.

Referring next to FIG. 7, the system is illustrated under a thermostat induced unload mode. It is assumed that the vehicle engine is experiencing neither acceleration nor deceleration and that again the vehicle is in a steady speed cruise situation. However, for some reason or the other, the temperature within the passenger compartment has decreased to the level where the drop in the warm air inlet to the evaporator 14 causes an appropriate electrical signal to be sent via electrical line 84 from thermostat 82 to the control panel 86. In the absence of energization of coils 248 and 250, the solenoid armature 214 will be centered by springs 224 and 226 between the coils, thus not centered with either coil. The energization of either coil 248 or coil 250 causes magnetically the armature 214 to shift axially so that it is centered with respect to the energized coil against the bias of one of the coil springs 224 and 226.

In that respect, in receipt of an electrical signal from thermostat 82 calling for less cooling, the pilot valve must shift to a position to effect unloading of the compressor. An electrical signal is sent from the control panel 86 through lines 254 to the unload coil 250, which when energized, causes the armature 214 to be centered axially with respect to that coil due to the magnetic flux set up about the unload coil 250. This causes the valve spool 208 to shift from left to right to the extent of completing communication between chamber 220 and line 192 leading directly to chamber 120 of the tracking valve. Keeping in mind that even with the valve spool 208 of the pilot valve shifted to its extreme right hand position, fluid communication is continued between the reduced discharge pressure control signal line or passage 234 and the right hand chamber 128 of the tracking valve. Thus, there is quite a high fluid pressure within chamber 128, while chamber 120 is at this time connected to the suction side of the compressor via lines 180, 190, 232 and 32. As may be seen, this causes the valve spool 100, within the tracking valve, to shift rapidly from right to left, uncovering the low pressure gas or oil drain port 166 to chamber 132 and, via passage 80, to the left hand chamber 54 of the slide valve actuator 40. This causes the slide valve 32, driven by piston 42, to shift from right to left since the right side of the same actuator piston 42 is at compressor discharge pressure. Land 108 continues to prevent fluid communication between the high pressure gas or oil supply line 172′ and passage 80. The presence of the adjustable bleed valve 148 prevents line 196 and thus chamber 128 from dropping to suction pressure through that bleed valve and line 192, which is at compressor suction pressure.

Figure 8:
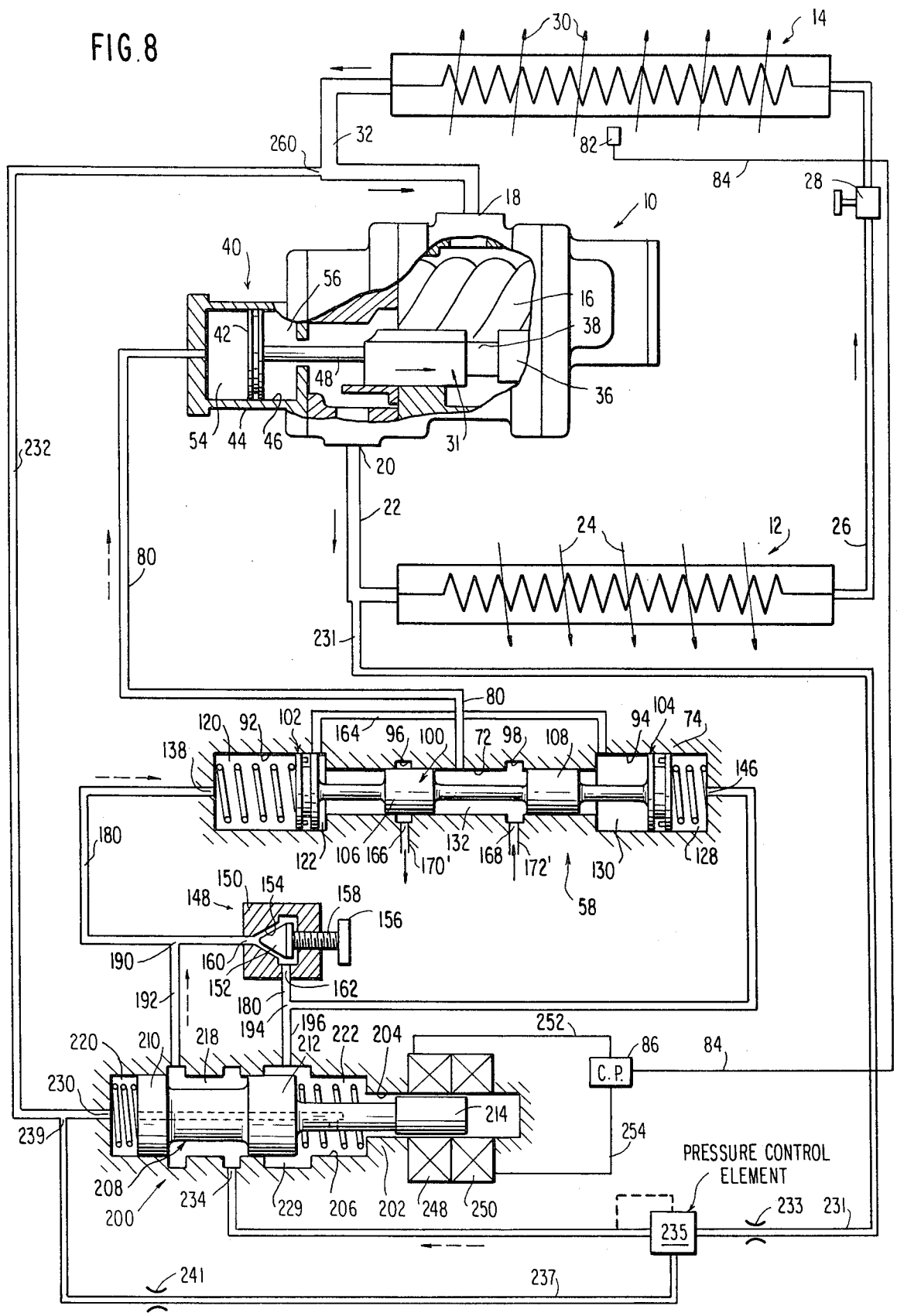
FIG. 8 is a schematic view of the system of FIG. 6 under conditions of evaporator warm air inlet temperature drop with subsequent compressor unloading.

Turning next to FIG. 8, further appreciation of the second embodiment of the invention may be had under conditions in which the compressor is required to be loaded as a result of an increase or rise in the temperature of the air within the passenger compartment and is seen by way of an increase in warm air inlet temperature leading to the evaporator 14. Again, it is assumed that the vehicle is under steady speed, cruise condition with no vehicle engine acceleration or deceleration. Thermostat 82 now senses the increase in the warm air inlet temperature and responds by energization of the load coil 248 associated with the pilot valve, the control panel 86 feeding an electrical control signal via line 252 to that coil.

The solenoid armature 214 centers with the load coil 248 compressing the coil spring 224, shifting the spool valve 208 from right to left. This has the effect of closing off fluid communication between reduced discharge pressure control signal passage 234 and passage 196 leading to chamber 120. The shift, however, does connect the reduced discharge pressure control signal passage 234, via line 192 and groove 238, directly to chamber 120 of the tracking valve 58. Land 244 shifts to the left to communicate chamber 218 to passage 192 to effect this result.

As may further be appreciated, with chamber 220 being at compressor suction pressure, the existence of bore 244 within the valve spool 208 causes transmission of this suction pressure to chamber 222 and the shift of land 212 to the left communicates chamber 222 with the annular groove 230 within the counterbore 206 to thus permit passage 196 and chamber 128 to be subjected to the suction pressure. This causes a rapid shift, due to the pressure differential between chambers 120 and 128, of the valve spool 100 of tracking valve 58 to the right, uncovering annular groove 98 within bore 72 of the tracking valve 58 to chamber 132 to cause a high pressure discharge gas or equivalent pressure oil supply to be directed via passage 80 to chamber 54 of the slide valve actuator. The slide valve actuator rapidly drives the slide valve 32 towards full load position, closing off gap 38.

From the above, the operation of the second embodiment of the invention may readily be appreciated. While the system is shown under a control scheme which involves control by discharge pressure, minor modifications such as switching of the suction and discharge pressure inputs and switching of lines or passages 192 and 196 to the pilot valve permits a controlled operation based on suction pressure, following the example of the first embodiment.

As further may be appreciated, the addition of the solenoid operated pilot valve permits the use of a main hydaulic spool valve which is not only used to unload on rapid change in discharge (or suction) pressure, but also functions during loading or unloading on demand to achieve proper shift of the slide valve 32. The main hydraulic spool valve may control the application of a hydraulic fluid to chamber 54, while the pilot valve sees only compressible working fluid, i.e., the reduced discharge pressure of the compressor and compressor suction pressure. The compressor discharge pressure should be reduced somewhat when used as a control fluid to prevent condensation.

While the invention has been particularly shown and descrived with reference to preferred embodiments thereof, it will be understood by those skilled in the art that the foregoing and various other changes in form and details may be made therein without departing from the spirit and scope of the invention.

What is claimed is:

1. A helical screw compressor slide valve engine RPM tracking system for an engine driven compressed gas refrigeration system, said refrigeration system including:

an engine driven helical screw rotary compressor having a low side, suction pressure inlet, and a high side, discharge pressure outlet, and a longitudinally shiftable slide valve for loading and unloading the compressor, a fluid pressure operated slide valve actuator operatively coupled to said slide valve for shifting said slide valve between full load and full unload positions, first control valve means for selectively connecting said slide valve actuator to the compressor high side discharge pressure outlet to effect compressor loading, and second control valve means for selectively connecting said slide valve actuator to the compressor low side suction pressure inlet to effect unloading of the compressor, the improvement wherein said tracking system comprises: tracking means responsive to engine acceleration and deceleration for immediately connecting said slide valve actuator to the low side compressor suction pressure inlet during engine acceleration to immediately unload the compressor and for connecting the slide valve actuator to the refrigeration high side discharge pressure outlet during engine deceleration to immediately load the compressor, thereby preventing refrigeration system temperature fluctuation due to engine acceleration or deceleration, and wherein said tracking means includes means for sensing a change in compressor suction pressure responsive to engine acceleration or engine deceleration, and means for operating said second control valve means and said first control valve means, respectively, to effect immediate unloading of the compressor or loading of the compressor as required to meet engine acceleration or deceleration conditions.

2. The helical screw compressor slide valve engine RPM tracking system as claimed in claim 1, wherein said tracking means comprises a tracking valve including a valve casing bearing a cylindrical bore, an axially displaceable valve spool slidably and sealably mounted within said casing cylindrical bore and shiftable between first and second extreme axial positions, means for operatively connecting said tracking valve between said slide valve actuator and said low side compressor suction pressure inlet and said high side compressor discharge pressure outlet such that when said tracking valve valve spool is in said first extreme axial position, said valve actuator is connected to the low side compressor suction pressure inlet and when said valve spool spool is in the second extreme axial position said slide valve actuator is connected to the low side compressor suction pressure inlet, means for normally centering said tracking valve valve spool within said casing bore to cut off connection between said slide valve actuator and said compressor high side discharge pressure outlet and said low side compressor suction pressure inlet, and means for applying either compressor high side discharge pressure or compressor low side suction pressure directly in one direction to said axially shiftable valve spool for shifting said valve spool in a given axial direction to one of said first and second extreme positions and for applying either said high side compressor discharge pressure or said low side compressor suction pressure through a restriction to said valve spool in the opposite axial direction such that said tracking valve valve spool is axially shifted to respective axial extreme positions.

3. The helical screw compressor slide valve engine RPM tracking system as claimed in claim 2, wherein said first and second control valve means comprise a three position solenoid operated pilot valve, said pilot valve comprising a valve casing, said pilot valve valve casing including a cylindrical bore, an axially slidable pilot valve cylindrical valve spool slidably and sealably positioned within said pilot valve casing bore, said pilot valve cylindrical valve spool bearing a solenoid armature, axially spaced load and unload coils fixed concentrically about said pilot valve cylindrical valve spool solenoid armature, means for biasing said pilot valve cylindrical valve spool such to a centered position within said casing bore with said solenoid armature centered between said load and unload coils such that energization of the low load coil causes said pilot valve cylindrical valve spool to shift to a first axial extreme position from said centered position, and energization of said unload coil causes said pilot valve cylindrical valve spool to shift oppositely, axially through said centered position to a second extreme axial position, means for operatively connecting said three position solenoid operated pilot valve between said compressor high side discharge pressure outlet and said compressor low side suction pressure inlet and said tracking valve such that when said pilot valve cylindrical valve spool is in centered position, one end of said tracking valve cylindrical valve spool is open directly to the compressor low side suction pressure or the compressor high side discharge pressure and the other end is open to the same pressure through a restriction to permit said tracking valve cylindrical valve spool to be responsive to engine acceleration and deceleration for controlling the position of the slide valve, when said pilot valve cylindrical valve spool is shifted to said first axial extreme position, upon energization of said unload coil, said pilot valve connects one end of said tracking valve valve spool to said compressor low side suction pressure and the other end of said tracking valve valve spool to said compressor high side discharge pressure, displacing the tracking valve valve spool to cause a connection of the slide valve actuator to the compressor low side discharge pressure inlet to effect compressor unloading, and upon energization of the load coil, the pilot valve valve spool is shifted to said second extreme axial position to cause the other end of said tracking valve valve spool to be connected to the compressor low side suction pressure and said one end of said tracking valve valve spool to the compressor high side discharge pressure, thereby shifting the tracking valve valve spool to a position such that said valve actuator is open to the compressor high side suction pressure inlet thereby loading the compressor.

4. The helical screw compressor slide valve engine RPM tracking system as claimed in claim 2, wherein said tracking valve valve spool comprises end lands at each end of said valve spool, said tracking valve casing bore is of a length in excess of the valve spool to form first and second end chambers with said end lands, respectively, said valve spool includes a pair of intermediate lands between said end lands and forming chambers between each of said intermediate lands and the adjacent end lands and a control center between said intermediate lands, said tracking valve valve casing includes axially spaced, radial inlet ports opening to the casing bore and connected to the compressor low side suction inlet and compressor high side discharge pressure outlet, respectively, said inlet ports being axially spaced such that when said tracking valve valve spool is centered, said ports are cut off to the central chamber by said intermediate lands, said valve casing including an outlet passage open to the center of said valve casing bore intermediate of said high and low pressure ports and being connected at the other end to said slide valve actuator, spring biasing coils mounted within said tracking valve casing bore chambers and abutting the outboard ends of said end lands to bias said tracking valve valve spool to axially centered position, and axial passages within said valve casing leading to the end chambers of said tracking valve for effecting the fluid pressure differential between valve spool ends for causing said tracking valve valve spool to shift to either of said first or said second axially extreme positions from said axially centered position, against said bias.

5. The helical screw compressor slide valve engine RPM tracking system as claimed in claim 3, wherein said tracking valve valve spool comprises end lands at each end of said valve spool, said tracking valve casing bore is of a length in excess of the valve spool to form first and second end chambers with said end lands, respectively, said valve spool includes a pair of intermediate lands between said end lands and forming chambers between each of said intermediate lands and the adjacent end lands and a control center between said intermediate lands, said tracking valve valve casing includes axially spaced radial inlet ports opening to the casing bore and connected to the compressor low side suction inlet and compressor high side discharge pressure outlet, respectively, said inlet ports being axially spaced such that when said tracking valve valve spool is centered, said ports are cut off to the central chamber by said intermediate lands, said valve casing including a passage open to the center of said valve casing bore intermediate of said high and low pressure ports and being connected at the other end to said slide valve actuator spring biasing coils mounted within said tracking valve casing bore and chambers and abutting the outboard ends of said end lands to bias said tracking valve valve spool to axially centered position, and axial passages within said valve casing leading to the end chambers of said tracking valve for effecting the fluid pressure differential between valve spool ends for causing said tracking valve valve spool to shift to either of said first or said second axially extreme positions from said axially centered position, against said bias.

6. The helical screw compressor slide valve engine RPM tracking system as claimed in claim 4, further comprising an equalizer line connecting the chambers formed between respective end lands and said pair of intermediate lands, whereby, during axial translation of said tracking valve valve spool, the chambers between the intermediate lands and the end lands are maintained at equal pressure.

7. The helical screw compressor slide valve engine RPM tracking system as claimed in claim 5, further comprising an equalizer line connecting the chambers formed between respective end lands and said pair of intermediate lands, whereby, during axial translation of said tracking valve valve spool, the chambers between the intermediate lands and the end lands are maintained at equal pressure.

8. The helical screw compressor slide valve engine RPM tracking system as claimed in claim 4, wherein said pilot valve valve spool is of a length less than the axial length of said pilot valve casing bore and comprises a pair of axially spaced lands of a diameter on the order of the bore of said pilot valve casing, said lands being separated by a reduced diameter portion forming an annular central chamber therebetween, said pilot valve, valve spool and said valve casing forming end chambers between the end faces of the lands and the ends of the valve casing bore, said end chambers each bearing a coil spring centering said pilot valve, valve spool forming said casing means, an axial passage within said valve casing leading to one of said end chambers and being connected to the compressor low side suction pressure inlet, an axial bore extending inwardly from one end of said pilot valve, valve spool and radial passage means within said pilot valve, valve spool and extending from said axial bore to the periphery of said valve spool within said other end chamber such that both end chambers are maintained at the same pressure, said valve casing further including first radial inlet passage means opening to said bore at an approximately axially central position of said axial bore, such that irrespective of the axial position of said pilot valve valve spool, said first radial inlet passage means is open to the central chember, and first and second radial outlet passage means opening to said bore on opposite sides of said inlet passage means and being axially displaced from each other such that when said load coil is energized, said central chamber connects the inlet passage to said first discharge passage to cause one end of said tracking valve valve spool to be connected to the compressor high side discharge pressure while one of said end chambers fluid connects the other end of said tracking valve valve spool to the compressor low side suction pressure to cause said tracking valve valve spool to shift to a position such that said slide valve actuator is connected to the compressor high side discharge pressure driving the slide valve towards full load position, and wherein when said unload coil is energized, axial displacement of the pilot valve, valve spool to the other extreme position against the bias of a coil spring causes said inlet passage to be connected via said annular central chamber directly to said other end of said tracking valve valve spool with said one end of said tracking valve, valve spool being connected through the other end chamber of said pilot valve directly to the compressor low side suction pressure to immediately displace the tracking valve valve spool to the extreme axial position wherein said slide valve actuator is open to the compressor low side suction pressure to rapidly shift said slide valve towards full unload position.

9. The helical screw compressor slide valve engine RPM tracking system as claimed in claim 5, wherein said pilot valve valve spool is of a length less than the axial length of said pilot valve casing bore and comprises a pair of axially spaced lands of a diameter on the order of the bore of said pilot valve casing, said lands being separated by a reduced diameter portion forming an annular central chamber therebetween, said pilot valve, valve spool and said valve casing forming chambers between the end faces of the lands and the ends of the valve casing bore, said end chambers, each bearing a coil spring and normally biasing said spool valve to an axially centered position, an axial passage within said valve casing leading to one of said end chambers and being connected to the compressor low side suction pressure inlet, an axial bore extending inwardly from one end of said pilot valve valve spool and radial passage means within said pilot valve valve spool and extending from said axial bore to the periphery of said valve spool within said other end chamber such that both end chambers are maintained at the same pressure, said valve casing further including first radial inlet passage means opening to said bore at an approximately axially central position of said axial bore, such that irrespective of the axial position of said pilot valve valve spool, said first radial inlet passage means is open to the central chamber, and first and second radial outlet passage means opening to said bore on opposite sides of said inlet passage means and being axially displaced from each other such that when said load coil is energized, said central chamber connects the inlet passage to said first discharge passage to cause one end of said tracking valve valve spool to be connected to the compressor high side discharge pressure while one of said end chambers fluid connects the other end of said tracking valve valve spool to the compressor low side suction pressure to cause said tracking valve valve spool to shift to a position such that said slide valve actuator is connected to the compressor high side discharge pressure driving the slide valve towards full load position, and wherein when said unload coil is energized, axial displacement of the pilot valve, valve spool to the other extreme position against the bias of a coil spring causes said inlet passage to be connected via said annular central chamber directly to said other end of said tracking valve valve spool with said one end of said tracking valve valve spool being connected through the other end chamber of said pilot valve directly to the compressor low side suction pressure to immediately displace the tracking valve valve spool to the extreme axial position wherein said slide valve actuator is open to the compressor low side suction pressure to rapidly shift said slide valve towards full unload position.

10. The helical screw compressor slide valve engine RPM tracking system as claimed in claim 9, wherein a shunt connecting passage connects said first and second radial discharge passage means of said pilot valve together intermediate of their connections to said pilot valve and the end chambers of said tracking valve, and wherein an adjustable bleed valve is positioned within said shunt connecting passage to create the pressure differential across the ends of said tracking valve valve spool when either compressor low side suction pressure or compressor high side discharge pressure is applied to the tracking valve ends to effect automatic loading and unloading of the engine during engine deceleration and acceleration, respectively.

* * * * *